(12) United States Patent
Krings et al.

(10) Patent No.: US 10,717,246 B2
(45) Date of Patent: Jul. 21, 2020

(54) FLEXIBLE SHEET-LIKE MATERIAL FOR BOUNDING A MATRIX MATERIAL FEED SPACE AND METHOD FOR THE PRODUCTION THEREOF

(71) Applicants: TRANS-TEXTIL GMBH, Freilassing (DE); AIRBUS DEFENCE AND SPACE GMBH, Taufkirchen (DE)

(72) Inventors: Wilhelm Krings, Laufen (DE); Manfred Hänsch, Ainring (DE); Leopold Pribil, Bad Vöslau (AT); Wilhelm Hierhammer, Ofterdingen (DE)

(73) Assignees: TRANS-TEXTIL GMBH, Freilassing (DE); AIRBUS DEFENCE AND SPACE GMBH, Taufkirchen (DE)

( * ) Notice: Subject to any disclaimer, the term of this patent is extended or adjusted under 35 U.S.C. 154(b) by 0 days.

(21) Appl. No.: 15/645,361

(22) Filed: Jul. 10, 2017

(65) Prior Publication Data

US 2017/0305079 A1 Oct. 26, 2017

Related U.S. Application Data

(62) Division of application No. 13/583,962, filed as application No. PCT/EP2011/001162 on Mar. 9, 2011.

(30) Foreign Application Priority Data

Mar. 11, 2010 (DE) .......... 10 2010 011 067

(51) Int. Cl.
| | | |
|---|---|---|
| *B29C 70/54* | (2006.01) | |
| *B32B 5/02* | (2006.01) | |
| *B32B 5/24* | (2006.01) | |
| *B32B 27/36* | (2006.01) | |
| *D06M 15/227* | (2006.01) | |
| *D06M 15/233* | (2006.01) | |
| *D06M 15/256* | (2006.01) | |
| *D06M 15/263* | (2006.01) | |
| *D06M 15/333* | (2006.01) | |
| *D06M 15/564* | (2006.01) | |
| *D06M 15/643* | (2006.01) | |
| *D06M 15/705* | (2006.01) | |
| *D06M 23/04* | (2006.01) | |
| *D06N 3/00* | (2006.01) | |
| *D06N 3/14* | (2006.01) | |
| *B29C 70/44* | (2006.01) | |
| *B29C 44/32* | (2006.01) | |

(52) U.S. Cl.
CPC .......... *B29C 70/548* (2013.01); *B29C 44/321* (2016.11); *B29C 70/443* (2013.01); *B32B 5/022* (2013.01); *B32B 5/024* (2013.01); *B32B 5/245* (2013.01); *B32B 27/36* (2013.01); *D06M 15/227* (2013.01); *D06M 15/233* (2013.01); *D06M 15/256* (2013.01); *D06M 15/263* (2013.01); *D06M 15/333* (2013.01); *D06M 15/564* (2013.01); *D06M 15/643* (2013.01); *D06M 15/705* (2013.01); *D06M 23/04* (2013.01); *D06N 3/0045* (2013.01); *D06N 3/0052* (2013.01); *D06N 3/14* (2013.01); *B32B 2262/02* (2013.01); *B32B 2262/04* (2013.01); *B32B 2262/062* (2013.01); *B32B 2262/101* (2013.01); *B32B 2266/0207* (2013.01); *B32B 2266/0214* (2013.01); *B32B 2266/0278* (2013.01); *B32B 2307/724* (2013.01); *D06N 2205/24* (2013.01); *Y10T 442/2139* (2015.04)

(58) Field of Classification Search
USPC .............................. 442/76; 427/302; 216/56
See application file for complete search history.

(56) References Cited

U.S. PATENT DOCUMENTS

| | | | |
|---|---|---|---|
| 4,210,697 A | 7/1980 | Adiletta | |
| 4,702,376 A | 10/1987 | Pagliaro | |
| 4,758,239 A | 7/1988 | Yeo et al. | |
| 5,019,422 A * | 5/1991 | Rose | A61L 15/24 427/245 |
| 5,665,301 A | 9/1997 | Alanko | |
| 6,843,953 B2 | 1/2005 | Filsinger et al. | |
| 2003/0011094 A1 | 1/2003 | Filsinger et al. | |
| 2003/0127024 A1 | 7/2003 | Heiberger | |
| 2009/0324965 A1 | 12/2009 | Beck et al. | |
| 2012/0119405 A1* | 5/2012 | Weber | B29C 33/10 264/101 |

FOREIGN PATENT DOCUMENTS

| | | |
|---|---|---|
| CN | 1193870 | 3/2005 |
| DE | 198 36 193 | 12/1999 |
| DE | 100 13 409 | 11/2000 |
| DE | 697 11 596 | 11/2002 |

(Continued)

OTHER PUBLICATIONS

International Search Resort for PCT/EP2011/001162 dated Jun. 30, 2011.

(Continued)

*Primary Examiner* — Lynda Salvatore

(74) *Attorney, Agent, or Firm* — Nixon & Vanderhye P.C.

(57) ABSTRACT

The flexible sheet-like material comprises a textile layer, which is coated at least on one side with a functional layer which is permeable to gas but impermeable to the matrix material, acting as a barrier layer for the matrix material, and is produced by coating the textile layer directly with a foam or a paste.

5 Claims, No Drawings

(56) References Cited

FOREIGN PATENT DOCUMENTS

| | | |
|---|---|---|
| DE | 102 53 100 | 5/2004 |
| DE | 600 18 455 | 1/2006 |
| DE | 603 10 425 | 10/2007 |
| DE | 10 2008 006 261 | 1/2009 |
| EP | 0 648 889 | 4/1995 |
| EP | 1 010 801 | 6/2000 |
| JP | 52-18995 | 2/1977 |
| JP | 56-26076 | 3/1981 |
| JP | 56-79780 | 6/1981 |
| JP | 57-125036 | 8/1982 |
| JP | 1-97272 | 4/1989 |
| JP | 2001-314447 | 11/2001 |
| JP | 2007-176134 | 7/2007 |
| JP | 2009-73124 | 4/2009 |
| JP | 2009-221626 | 10/2009 |
| WO | WO 2004/088019 | 10/2004 |
| WO | WO 2009/092543 | 7/2009 |

OTHER PUBLICATIONS

Tetzlaff, N., "Stand der Technik in der Schaumausrustung und Schaumbeschichtung", In: Chemiefasern/textilindustrie, (Dec. 1982), pp. 896-902.

Official Action in German 10 2010 011 067.1 dated Nov. 23, 2012.

\* cited by examiner

FLEXIBLE SHEET-LIKE MATERIAL FOR BOUNDING A MATRIX MATERIAL FEED SPACE AND METHOD FOR THE PRODUCTION THEREOF

CROSS-REFERENCE TO RELATED APPLICATIONS

This application is a divisional of U.S. application Ser. No. 13/583,962, filed Sep. 11, 2012, which is the U.S. national phase of International Application No. PCT/EP2011/001162, filed Mar. 9, 2011, which designated the U.S. and claims priority to DE Application No. 10 2010 011 067.1, filed Mar. 11, 2010, the entire contents of each of which are hereby incorporated by reference.

BACKGROUND

The invention relates to a flexible sheet-like material for defining a matrix material feed space in the production of fibre-reinforced plastics material components from composite fibre semi-finished products. The invention also relates to a process for the production of a flexible sheet-like material of this type.

In the production of fibre-reinforced plastics material components, it is known that dry composite fibre semi-finished products, so-called preforms, are initially used which are impregnated with flowable, curable matrix material in the form of resin. The dry composite fibre semi-finished product can be present as woven fabric, as multi-axial non-crimp fabric or as chain-reinforced unidirectional semi-finished product and consists in particular of carbon fibres, glass fibres, aramid fibres, boron fibres or hybrid materials.

A process for the production of fibre-reinforced plastics material components is known as the resin-film-infusion (RFI) process. In this process, a dry carbon fibre woven fabric or non-crimp fabric is deposited in a curing device and covered from outside with a defined amount of resin film. Thereafter, the plastics material component consisting of the carbon fibres and resin is cured under pressure and heat in an autoclave or in another pressure vessel. However, the use of pressure vessels and the complex moulds required for this purpose are very expensive. Furthermore, it is difficult to manage a process of this type in respect of temperature and pressure. Moreover, the available autoclaves restrict the size of the plastics material components to be produced.

To avoid these disadvantages, a process has been developed which is described in DE 100 13 409 C1 and is called "VAP" (Vacuum Assisted Process). This process uses a multi-layer, flexible sheet-like material which defines a matrix feed space in which the semi-finished product is arranged. The sheet-like material consists of a plurality of separate layers which are to be handled independently of one another, namely a membrane which is permeable to gas but impermeable to matrix material, a highly gas-permeable spacer layer and a gas-impermeable film. These layers are successively positioned individually over a flow-promoting layer which is applied onto the semi-finished product. When the region between the film and the membrane is evacuated, thereby causing the build-up of a vacuum, the pressure is also reduced accordingly in the inner matrix feed space through the membrane, as a result of which liquid resin (matrix material) is drawn by suction from an external resin container into the matrix material feed space. In this respect, although the membrane allows gases to escape out of the matrix feed space into the spacer layer and from there to the outside, at the same time it holds back the resin in the matrix material feed space, so that the resin can infiltrate into the semi-finished product.

Although VAP affords considerable advantages over processes which use autoclaves, it suffers from the particular problem that the individual layers of the sheet-like material, namely the membrane, the spacer layer and the gas-impermeable film have to be positioned very precisely and without tension in succession over the semi-finished product. Accordingly, this is time-consuming and, if not performed accurately, can adversely affect the process reliability and can result in non-uniform accumulations in the matrix material.

These problems are avoided by a multi-functional laminate which is described in DE 10 2008 006 261 B3. In this case, a textile layer is laminated onto the membrane, which is permeable to gas but impermeable to matrix material, and furthermore the spacer layer is fixed to the textile layer. The gas-permeable film can either be positioned separately over the spacer layer or firmly joined to the spacer layer and, in the latter case, the film is also a fixed component of the multi-functional laminate. This multi-functional laminate provides significant advantages in respect of management, process accuracy and process reliability. However, with a multi-layer laminate of this type, the desired mechanical material characteristics and the characteristics in respect of gas permeability, matrix material impermeability and temperature resistance of the membrane and of the textile layer often cannot be accurately adjusted in the desired simple manner. The reasons for this are, inter alia, that the characteristics, present before the lamination process, of the membrane on the one hand and of the textile layer on the other can change significantly due to the lamination process and depending on the type, application method and amount of adhesive used between membrane and textile layer during lamination. A further disadvantage is that in these known configurations, the flow front of the resin cannot be observed, because the above-mentioned sheet-like materials are non-transparent.

BRIEF SUMMARY

The object of the invention is to provide a flexible sheet-like material for defining a matrix material feed space of the type mentioned at the outset, which sheet-like material is particularly suitable for VAP. Furthermore, a process for the production of a flexible sheet-like material of this type is to be provided, by which it is possible to produce the sheet-like material in the simplest possible manner and particularly accurately in respect of its gas-permeability and matrix material-impermeability characteristics.

This object is achieved according to the invention by a flexible sheet-like material having the features of claim 1 and by a process having the features of claim 5. Advantageous embodiments of the invention are described in the subclaims.

According to the invention, the flexible sheet-like material comprises a textile layer which is coated on at least one side with a gas-permeable, but matrix material-impermeable function layer which acts as a barrier layer for the matrix material and is produced by the direct coating of the textile layer with a foam or a paste.

DETAILED DESCRIPTION

According to an advantageous embodiment, the textile layer is a woven fabric, an interlaced fabric, a knitted fabric, a non-woven fabric or a felt and consists at least mainly of one or more of the following materials: polyester, polyamide, aramid, glass fibres, polyacrylic, in particular polyacrylonitrile, polypropylene, polyethylene, viscose, cellulose and cotton.

This textile layer acts as a substrate for the function layer which is directly applied to the textile layer by the direct coating process and which, during the coating procedure, has a foam or paste structure and gives the finished sheet-like material the desired characteristics necessary for VAP, in particular characteristics with respect to gas permeability and matrix material impermeability (resin impermeability).

According to an advantageous embodiment, the function layer is produced from a foam or a paste which is produced from an aqueous polymer dispersion with at least mainly one or more of the following substances: polyurethane, fluoropolymers, in particular polytetrafluorethylene, acrylate, in particular styrene acrylate, latex, in particular nitrile-butadiene latex (NBR) or styrene-butadiene latex (SBR), silicone, copolymers, in each case with additives.

Alternatively, the function layer can also be produced from a paste which is produced from a solvent-containing polymer with at least mainly one or more of the following substances: polyurethane, fluoropolymers, in particular polytetrafluorethylene, acrylate, in particular styrene acrylate, latex, in particular nitrile-butadiene latex (NBR) or styrene-butadiene latex (SBR), ethylene vinyl acetate, polyvinyl acetate, silicone, copolymers of the above-mentioned substances, in each case with additives.

The textile layer can be coated on one or both sides with the function layer. The textile layer is advantageously only coated on one side with the function layer, while provided on the opposite side of the textile layer is a spacer layer which keeps a gas-impermeable film, which can be arranged over the spacer layer, at a distance from the textile layer. The spacer layer is highly gas-permeable and, when a vacuum is produced in the space between the film and the textile layer, it keeps the film at a distance from the textile layer. Therefore, the spacer layer and the film are always located on the side of the textile layer remote from the matrix material feed space.

It is also possible for the textile layer to be directly coated on its side remote from the matrix material feed space with a spacer layer applied by the direct coating process. Alternatively, it is also possible for the spacer layer to be laminated onto the textile layer, before or after the textile layer has been coated on the opposite side with the function layer.

The flexible sheet-like material according to the invention has the advantage that compared to known sheet-like materials, it can be produced more easily and more accurately in respect of the desired characteristics, particularly in respect of gas permeability and matrix material impermeability. Furthermore, the sheet-like material can be readily configured such that it is transparent or semi-transparent, thereby making it possible to observe the resin flow front in VAP.

In the process according to the invention, the textile layer is coated on at least one side by a direct coating process with a gas-permeable but matrix material-impermeable foam layer or paste layer which forms a barrier layer for the matrix material. Thus, it is characteristic of the process according to the invention that the gas-permeable, matrix material-impermeable function layer is no longer laminated onto the textile layer as a separately produced membrane, but that a function layer consisting of foam or paste is applied by a direct coating process to the textile layer which forms the substrate for the foam or paste layer. The desired material characteristics, in particular the degree of gas permeability and of matrix material impermeability can be adjusted very precisely by this direct coating process. Furthermore, the direct coating process affords advantages and greater variation possibilities in formulation and affords further possibilities in the pretreatment and aftertreatment of the textile layer, as a result of which the gas permeability and matrix material impermeability of the sheet-like material can also be controlled. It is also possible to produce the sheet-like material such that it is transparent or semi-transparent due to the choice of suitable coating materials and additives and by a targeted calendering of the applied coating material. Consequently, as stated above, it is possible to observe the resin flow front when the finished sheet-like material is used in VAP.

As already mentioned above, the following are suitable for the textile layer used in the process according to the invention: woven fabric, interlaced fabric, knitted fabric, non-woven fabric or felt which mainly consists of one or more of the following materials: polyester, polyamide, aramid, glass fibres, polyacrylic, polypropylene, polyethylene, viscose, cellulose and cotton. Mixtures of the above-mentioned materials are easily possible.

To control the penetration of the foam or paste into the textile material, to improve adhesion, strength and abrasion resistance, there is a large number of finishing options on a chemical, chemical-thermal and also physically mechanical basis. For example, it may be expedient for the textile layer to be pretreated with additives prior to coating, which additives are produced from aqueous or organic solutions and comprise impregnating resins, surfactants, silica sol derivatives, additives for material protection, flame proofing, bonding agents or the like.

The foam or paste can be applied to the textile layer by very diverse methods, for example by:
 a spreading method using a doctor blade
 an immersion method using foulard rollers
 a printing or screen printing method using engraved rollers or screen printing stencils
 casting methods (for example curtain coating).

After the foam or paste has been applied to the textile layer and then dried at a moderate temperature, the foam or paste layer is expediently compressed and smoothed by a calendering device under elevated temperature and elevated pressure in order to influence in a targeted manner the gas-permeability and/or matrix material-impermeability characteristics of the sheet-like material. These measures provide extensive control possibilities for achieving the desired material characteristics.

Water-based foams, water-based pastes or pastes containing a solvent are advantageously used for the direct coating procedure of the mentioned textile substrates. In particular, the textile layer can be coated with a foam or a paste based on an aqueous polymer dispersion, the foam or paste at least mainly consisting of one or more of the following substances: polyurethane, fluoropolymers, in particular polytetrafluorethylene, acrylate, in particular styrene acrylate, latex, in particular nitrile-butadiene latex or styrene-butadiene latex, ethylene vinyl acetate, polyvinyl acetate, silicone and copolymers of the above-mentioned substances. Mixtures of the above-mentioned substances are possible. Further additives, such as foaming agents, defoamers, foam stabilisers, cross-linking reagents, fillers (inter alia kaolin, chalk, silicic acid derivatives) are added as required.

In this respect, polyurethane foam and paste coatings based on an aqueous dispersion can be used in a particularly advantageous and versatile manner.

For the foam coating, foams can be used which are either produced mechanically ("beaten foam") or chemically ("blown foam"). The production of the foam using so-called microsphere capsules (for example Expancel® by Akzo Nobel) is mentioned as a specific field of chemical—more precisely physical—foaming. When the temperature is increased, these capsules expand in volume by up to 40 times and form a foam-like structure in the matrix.

When pastes or mechanically produced foam are used, specific additives are expediently added to influence the viscosity, as well as fillers, pigments, cross-linking agents etc., to obtain the desired characteristics. Furthermore, agents for influencing the foam density are expediently added during production of the foam.

During production of chemically or thermally produced foam, specific additives can also be added to influence the viscosity and the litre weight of the foam as well as stabilisers, fillers, cross-linking agents etc.

After a coating of this type has been applied onto the textile layer and then dried, the coating is compressed and smoothed at a specific temperature and at a specific pressure on calendering equipment. During this procedure, the calender temperature is precisely adjusted subject to the type of polymer and crosslinking, the degree of foaming, hardness modulus of the dispersion and depending on the other additives, so that optimum results are achieved in respect of gas permeability and matrix material impermeability (resin density) during injection according to VAP.

It is particularly advantageous when, in the case of a foam coating, the material to be foamed has a viscosity of 5-60 dPas (preferably 35-45 dPas) before foaming and, when applied to the textile layer, has a foam weight of 100 to 900 g/l (preferably 200-350 g/l), the dry layer weight amounting to 10-120 $g/m^2$ (preferably 30-40 $g/m^2$).

In the case of aqueous pastes, a viscosity of 5-160 dPas (preferably 40-100 dPas) is advantageous depending on the application process. In the conventional doctor process, 60-80 dPas has proved to be particularly advantageous. In this case as well, the dry layer weight is 10-120 $g/m^2$ (preferably 35-45 $g/m^2$).

All viscosity values stated in connection with the present invention relate to measurements using "Haake Viscotester 2 plus", measuring body 1 or 2.

As stated above, as an alternative to aqueous dispersion foams or pastes, pastes can also be used which are based on a solvent-containing polymer. In this case, the paste at least mainly consists of one or more of the following substances: polyurethane, fluoropolymers, in particular polytetrafluoroethylene, acrylate, in particular styrene acrylate, latex, in particular nitrile-butadiene latex or styrene-butadiene latex, ethylene vinyl acetate, polyvinyl acetate, silicone, copolymers of the above-mentioned substances and mixtures of these substances. The paste also contains the necessary additives.

In this respect, it is particularly advantageous if the solvent-containing paste has a viscosity of 5-60 dPas (preferably 35-45 dPas) when applied onto the textile layer, the dry layer weight amounting to 10-120 $g/m^2$ (preferably 40-50 $g/m^2$).

The textile layer can also be coated by means of a so-called "coagulation coating" process or "extraction coating" process.

In one coagulation coating process, before the textile layer is coated, electrolyte salts, chemical additives or ionic differential additives, for example are applied to the textile layer to produce precipitation reactions in the paste or in the foam. In a different coagulation coating process, for example electrolyte salts, additives for thermosensitive precipitation or ionic differential additives are introduced into the coating medium (paste or foam) to produce precipitation reactions in the paste or in the mixture to be foamed. As an alternative or in addition, it is also possible in the coagulation coating process to subject the coated sheet-like material to a subsequent aftertreatment by means of alkalisation or acid elimination from aqueous liquors to produce pore formation in the polymer film.

It is possible that the foam or paste is brought to precipitation/coagulation due to an arising instability while drying on the textile layer. An instability of this type arises in particular due to an incompatibility of individual constituents of the coating material as the temperature rises and/or when the pH changes.

In extraction coating, the paste or the material to be foamed contains additives which are partly or completely extracted again from the coating, are washed out or are released therefrom in another manner due to an aftertreatment of the coated sheet-like material. This is possible by an aftertreatment using aqueous-based products and solvent-based products, in particular by a perchloroethylene cleaning on continuous installations.

It applies to all the stated direct coating processes that the textile substrates which are used can be suitably pretreated so that, during the subsequent direct coating procedure onto this pre-finished textile layer, special effects are achieved for positively influencing, for example, coagulation, microporosity, gas permeability and resin density also at relatively high infiltration temperatures during VAP. An advantageous pretreatment of the textile layer consists of a separate pre-impregnation of the textile layer with FC resins for hydrophobisation, to reduce infiltration or also penetration of the paste or foam into the textile.

In the following, the invention will be described in more detail on the basis of two embodiments, with which it was possible to achieve particularly advantageous results. In Example 1, a textile substrate was coated with a foam based on an aqueous dispersion, while in Example 2, a textile substrate was coated with a solvent-containing paste. In both cases, it was possible to achieve very good results in respect of production accuracy, gas permeability and matrix material impermeability of the finished sheet-like material.

Example 1 (Foam)

Material of textile layer: Polyester woven fabric
Coating material (foam): Polyurethane-based aqueous dispersion with additives
   Viscosity of the material to be foamed: 35-45 dPas
   Foam weight: 200-240 g/l
   Dry layer weight: 35-40 $g/m^2$
Calender temperature when pre-chintzing the textile: 170-200° C., in particular 185° C.
Application method: Doctor or stencil coating
Foam drying temperatures: 80-130° C.
Calender temperature during compression: 170-200° C., in particular 180° C.

Example 2 (Paste)

Material of textile layer: Polyester woven fabric
Coating material (paste): Solution of polyurethane with additives to achieve a micro-porosity by coagulation (selective drying)
   Viscosity: 35-45 dPas
   Dry layer weight: 40-50/$m^2$ Calender temperature when pre-chintzing: 170-200° C., in particular 185° C.
Application method: Doctor or stencil coating
Drying/condensation temperature: 20-225° C.
Calender temperature during compression (optional): 120-190° C.

The invention claimed is:

1. A process for the vacuum assisted production of fibre-reinforced plastics material components from composite fibre semi-finished products which are arranged in a matrix material feed space, the process comprising:

defining the matrix material feed space with a flexible sheet-like material, wherein the flexible sheet-like material comprises a textile layer and a gas-permeable but matrix material-impermeable foam layer or paste layer on the textile layer, the foam or paste layer being a barrier layer for a matrix material, the foam or paste layer comprising acrylate or a combination of acrylate and polyurethane, the dry layer weight of the foam or paste being 35-120 $g/m^2$ and the foam or paste being compressed by a calendering device at an elevated pressure and an elevated temperature of 170-200° C.; and drawing the matrix material by suction from an external resin container into the matrix material feed space.

2. The process according to claim 1, wherein the textile layer is a woven fabric, an interlaced fabric, a knitted fabric, a non-woven fabric or a felt and comprises:

polyester, polyamide, aramid, glass fibres, polyacrylic, polypropylene, polyethylene, viscose, cellulose, or cotton.

3. The process according to claim 1, wherein when applied to the textile layer, the foam has a weight of 100-900 g/l.

4. The process according to claim 3, wherein when applied to the textile layer, the foam has a weight of 200-350 g/l.

5. The process according to claim 1, wherein before the textile layer is coated, it is pretreated with additives which are produced from aqueous or organic solutions and comprise at least one substance selected from the group consisting of:

fluorocarbon resins, impregnating resins, surfactants, silica sol derivatives, and bonding agents.

* * * * *